R. SHIPMAN.
FRICTION DRIVE.
APPLICATION FILED FEB. 5, 1913. RENEWED JUNE 29, 1916.
1,235,940.
Patented Aug. 7, 1917.
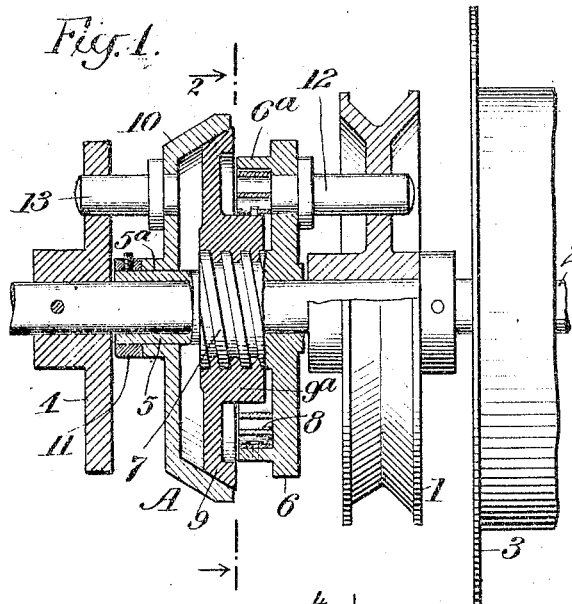
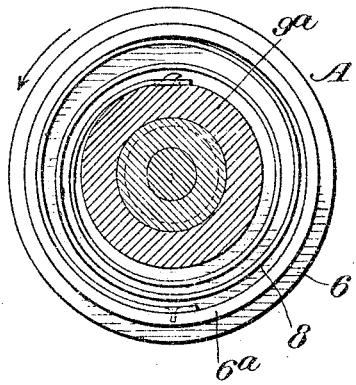
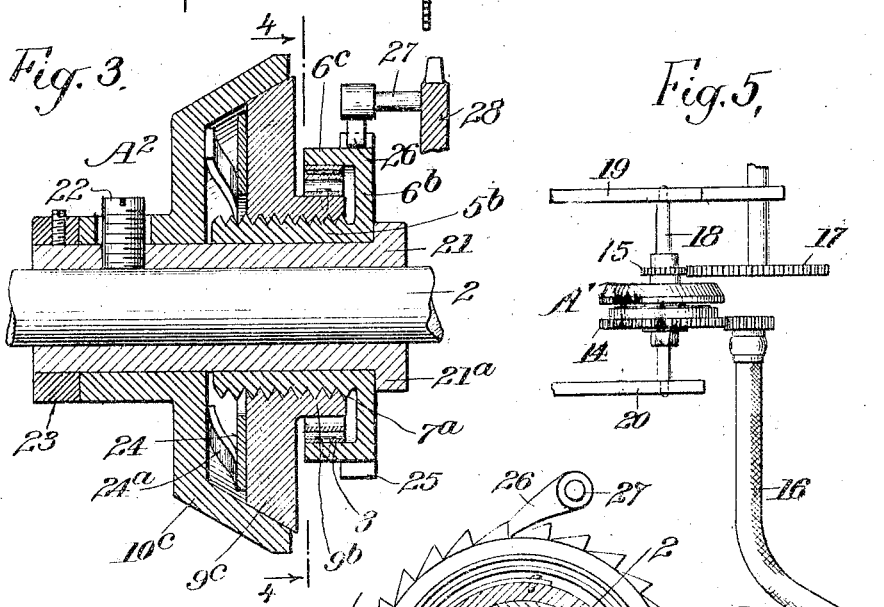
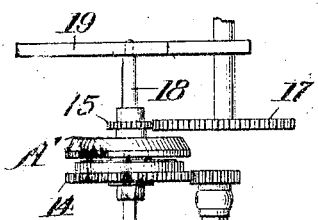
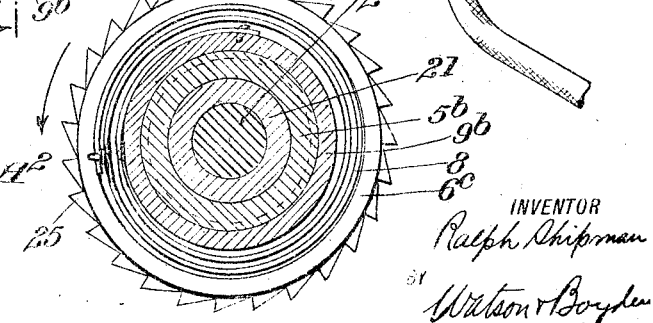
WITNESSES
INVENTOR
Ralph Shipman
BY Watson & Boyden
ATTORNEYS

UNITED STATES PATENT OFFICE.

RALPH SHIPMAN, OF SUNBURY, PENNSYLVANIA.

FRICTION-DRIVE.

1,235,940.  Specification of Letters Patent.  Patented Aug. 7, 1917.

Application filed February 5, 1913, Serial No. 746,344. Renewed June 29, 1916. Serial No. 106,732.

*To all whom it may concern:*

Be it known that I, RALPH SHIPMAN, a citizen of the United States, residing at Sunbury, in the county of Northumberland and State of Pennsylvania, have invented certain new and useful Improvements in Friction-Drives, of which the following is a specification.

The purpose of this invention is to provide a self-contained friction drive which can be readily applied to mechanisms of various kinds, between the source of power and the mechanism to be driven, and which will maintain the torque of the driven mechanism constant, where the resistance of the load is constant, notwithstanding variations in the speed of the driving means.

In the accompanying drawing,

Figure 1 is a view partly in central section and partly in side elevation, showing one form of friction drive applied to the winding shaft of a moving picture machine;

Fig. 2 is a section on the line 2—2 of Fig. 1;

Fig. 3 is a central sectional view through a modified form of friction drive;

Fig. 4 is a section on the line 4—4 of Fig. 3; and,

Fig. 5 is a side elevation of a friction drive similar to that shown in Fig. 1, illustrating its application to a clock train operated by a flexible shaft.

Referring to Figs. 1 and 2 of the drawing, wherein the friction drive is shown, for the purpose of illustration, upon the winding shaft of a moving picture machine, 1 indicates a driving pulley, loosely mounted upon a shaft 2 which carries the film-winding reel 3. Upon this shaft is also secured a disk 4, and between said disk and the driving pulley is arranged the friction drive mechanism, indicated as a whole by the letter A. This mechanism, in the figures referred to, comprises a sleeve 5 which fits loosely on the shaft 2 and is provided with a driving head or member 6, and an external worm or threaded portion 7 adjacent the head. The head is provided with a lateral flange 6ª forming a housing, within which is arranged a flat spiral spring 8 having one or more coils wound about the axis of the sleeve, said spring having one end connected to said flange and the other end connected to the hub 9ª of a friction disk 9 which is internally threaded, and mounted so as turn freely upon the worm 7. Another friction disk 10 is journaled upon a smooth bearing portion 5ª of the sleeve. The spiral spring 8 constantly tends to turn the friction disk 9 on the threads of the sleeve in the direction to carry said disk away from the head 6 and against the friction disk 10. The latter is held against longitudinal movement on the sleeve by a collar 11, secured to the sleeve, and located so as to position the disk 10 with respect to the disk 9 so as to give the desired degree of friction between the disks. It will be evident that the amount of friction between the disks may be varied by slightly changing the position of the collar 11. When the sleeve 5 and the parts mounted thereon, constituting the friction drive, are to be applied between the power source and the load to be driven, the sleeve is placed on the shaft, as shown, and the driving member or head 6 is connected to the driving source, while the friction disk 10 is connected to the load to be driven. Thus, in Fig. 1, the driving head 6 is provided with a pintle 12 which enters a perforation in the web of the pulley 1, so that when the pulley is driven, the driving head will be carried around positively thereby, and the disk 10 is provided with a pintle 13 which enters a suitable perforation in the disk 4 so that when the disk 10 turns, it will drive the disk 4 and the shaft 2. In operation, when the pulley 1 of Fig. 1 is driven by a belt, the sleeve 5 and driving head 6 will be carried around by the pulley 1 and pintle 12, in the direction indicated by the arrow, Fig. 2, and the friction disk 9 will be dragged around by the spiral spring 8. The friction disk 10 will also be driven by reason of its engagement with the disk 9, and the disk 4, shaft 2, and reel 3 will turn in unison with the friction disk 10. It is desirable, in a moving picture machine, to have the take-up reel exert a uniform pull upon the film while the pictures are being exhibited, but such machines are very commonly operated by hand and it is difficult for the operator to operate the reel so as to maintain this uniform tractive effort upon the film, notwithstanding provision is made for allowing the driving belt to slip when the power applied thereto increases above a certain amount. As the load or resistance is nearly constant, it will be seen that with the friction drive of my invention, if the speed of the driving pulley 1, and hence of the driving head 6, is increased, the slightly greater friction occurring between the disks 9 and 10 will cause the disk 9 to turn on the worm 7, against the action of the spring 8, in the direction which will lessen the frictional engagement of the disks 9 and 10. As the spring constantly urges the disk 9 toward the disk 10, it will be evident that the two disks will be always held in engagement, but that there will be more or less slippage between them, according to the fluctuations in the speed of the driving pulley, and hence the driven shaft 2 and the reel thereon will be driven with a practically constant torque, regardless of fluctuations in speed of the driving means.

In Fig. 5, the friction drive A' is substantially the same as that shown in Fig. 1, the difference being that gears 14 and 15 are substituted for the pins 12 and 13. In Fig. 5, the friction drive is shown interposed between a flexible shaft 16, and a gear 17 which may be the main driving gear of a clock train in certain types of instruments used for indicating the running time and speed of motor cars, or other vehicles, where the clock train is actuated by the movement of the vehicle through the medium of a flexible shaft. As the clock train offers a constant resistance, while the speed of the flexible shaft varies, it will be seen that the friction drive will cause a constant force to be applied to the clock train, notwithstanding wide fluctuations in the speed of the flexible shaft. In applying the friction drive to a clock mechanism, it is merely necessary to slip the sleeve 5, on to a spindle 18, suitably arranged between supporting plates 19 and 20 of the clock mechanism.

In the friction drive A², shown in Figs. 3 and 4, the parts are mounted upon a tubular shaft or sleeve 21 which is to be secured, as by means of a set screw 22, to the shaft 2 of a moving picture machine or other mechanism. Upon this tubular shaft or sleeve 21 is mounted a sleeve 5ᵇ having external threads 7ª, and a head 6ᵇ is secured to the sleeve, and this sleeve has a lateral flange 6ᶜ, within which is arranged a flat spiral spring 8 having one end secured to said flange, and its opposite end secured to the hub 9ᵇ of a friction disk 9ᶜ. This friction disk engages a friction disk 10ᶜ which is mounted upon the tubular shaft or sleeve 21, and connected to said sleeve by the set screw 22. The parts are held in their proper positions by a shoulder 21ª on the tubular shaft, and an adjustable collar 23 on said shaft. Preferably, where the device is large and used for heavy work, a ring or washer 24 is placed between the friction disks 9ᶜ and 10ᶜ, and this washer has tongues 24ª which tend slightly to force the disks apart, this being merely to prevent the disks from sticking together. In these figures also, I have shown teeth 25 upon the driving member 6ᵇ, adapted to be engaged by a suitable pawl 26, which pawl may be connected to a sprocket wheel 28 upon the shaft 2, by a suitable stud 27, where a sprocket chain drive is used instead of the pulley drive, as shown in Fig. 1.

In the operation of the device sl Figs. 3 and 4, when the driving head 6 is turned, the friction disk 9ᶜ is dragged around with it by means of the spring, and through the engagement of the friction disks, the tubular shaft 21, which supports the parts is driven along with the shaft 2. It will be evident that any increase in the speed of the driving head, if the load to be driven is constant, will result in lessening the frictional contact between the disks 9ᶜ and 10ᶜ, and the speed of the driven shaft will remain practically constant.

What I claim is:

1. In a friction drive mechanism a sleeve and a driving head or member attached thereto, two co-engaging clutch-members, one loosely threaded on to said sleeve, and a spring wound about the axis of the sleeve connecting said latter clutch-member with the driving member.

2. In a friction drive mechanism a sleeve and a driving head or member attached thereto, said member having a lateral flange, two co-engaging clutch-members, one loosely threaded on to said sleeve, said latter member having a hub, and a spiral spring connecting said flange with said hub.

3. In a friction drive mechanism a shaft to be driven, a sleeve journaled on said shaft and a driving head or member connected to the sleeve, said sleeve having an externally threaded portion, two co-engaging clutch-members, one loosely threaded onto the sleeve and the other connected to the shaft so as to drive the latter, and a spiral spring wound about the axis of the sleeve and connecting the first mentioned clutch-member with the driving head.

4. A sleeve having a driving head thereon, said sleeve having an external thread adjacent the head, two co-engaging friction disks journaled on the sleeve, one engaging the thread, and a spiral spring connecting the latter disk with the head.

5. A sleeve having a driving head thereon, said sleeve having an external thread adjacent the head, two co-engaging friction disks journaled on the sleeve, one engaging the thread, a spiral spring connecting the latter disk with the head, and an adjustable stop on the sleeve for adjusting the position of the other disk.

6. A sleeve having a driving head provided with a lateral flange encircling the sleeve, said sleeve having an external thread adjacent the head, two co-engaging friction disks journaled on the sleeve, one engaging the thread and having a hub extending within said flange, and a spiral spring connecting said flange with said hub.

7. In a friction drive mechanism, a tubular shaft, a sleeve mounted thereon, said sleeve having an external thread, a driving head attached to said sleeve, a clutch-member having threads engaging the threads on the sleeve, a spiral spring connecting said clutch-member with the head, and a second clutch-member secured to said shaft and engaging said first mentioned clutch-member.

8. In a friction drive mechanism, a tubular shaft, a sleeve mounted thereon, said sleeve having an external thread, a driving head attached to said sleeve, a clutch-member having threads engaging the threads on the sleeve, a spiral spring connecting said clutch member with the head, a second clutch-member secured to said shaft and engaging said first mentioned clutch member, and a spring between said clutch-members tending to press them apart.

9. A friction drive mechanism comprising coaxial driving and driven members, an externally threaded sleeve connected with one of said members, two engaging clutch elements, one threaded onto the sleeve and the other connected to the other of said members, and a spring wound about the axis of the said driving and driven members and connected to the threaded clutch element and to the adjacent driving or driven member, the spring and threads being relatively arranged to maintain a constant frictional engagement between the clutch elements.

In testimony whereof I have affixed my signature, in presence of two witnesses.

RALPH SHIPMAN.

Witnesses:
 JOHN HEISER BASSLER,
 B. F. HECKERT.